US009225876B2

(12) United States Patent
Kostyukov et al.

(10) Patent No.: US 9,225,876 B2
(45) Date of Patent: Dec. 29, 2015

(54) METHOD AND APPARATUS FOR USING AN ENLARGEMENT OPERATION TO REDUCE VISUALLY DETECTED DEFECTS IN AN IMAGE

(71) Applicants: Mikhail Kostyukov, Moscow (RU); Ivan Zagaynov, Moscow (RU)

(72) Inventors: Mikhail Kostyukov, Moscow (RU); Ivan Zagaynov, Moscow (RU)

(73) Assignee: ABBYY Development LLC (RU)

( * ) Notice: Subject to any disclaimer, the term of this patent is extended or adjusted under 35 U.S.C. 154(b) by 0 days.

(21) Appl. No.: 14/317,246

(22) Filed: Jun. 27, 2014

(65) Prior Publication Data

US 2015/0085327 A1    Mar. 26, 2015

Related U.S. Application Data

(63) Continuation-in-part of application No. 14/314,081, filed on Jun. 25, 2014.

(60) Provisional application No. 61/882,615, filed on Sep. 25, 2013, provisional application No. 61/890,014, filed on Oct. 11, 2013, provisional application No. 61/890,023, filed on Oct. 11, 2013.

(30) Foreign Application Priority Data

Dec. 25, 2013 (RU) .................................. 2013157755

(51) Int. Cl.
*H04N 1/393* (2006.01)
*H04N 1/409* (2006.01)
*H04N 1/387* (2006.01)

(52) U.S. Cl.
CPC .............. *H04N 1/393* (2013.01); *H04N 1/387* (2013.01); *H04N 1/3876* (2013.01); *H04N 1/3935* (2013.01); *H04N 1/409* (2013.01); *H04N 1/4092* (2013.01)

(58) Field of Classification Search
None
See application file for complete search history.

(56) References Cited

U.S. PATENT DOCUMENTS

| 5,982,931 | A | 11/1999 | Ishimaru |
| 8,755,604 | B1 | 6/2014 | Gross et al. |
| 2004/0212692 | A1* | 10/2004 | Nakami et al. ............. 348/224.1 |
| 2010/0067794 | A1 | 3/2010 | Barkan et al. |
| 2010/0220341 | A1 | 9/2010 | Kondo |
| 2011/0268369 | A1 | 11/2011 | Richards et al. |
| 2012/0243051 | A1* | 9/2012 | Le Glaunec et al. ........... 358/2.1 |
| 2014/0035910 | A1* | 2/2014 | Wakai et al. .................. 345/419 |
| 2014/0219575 | A1 | 8/2014 | Govindarao et al. |
| 2014/0225926 | A1* | 8/2014 | Mathers ....................... 345/634 |
| 2014/0270528 | A1* | 9/2014 | Ramos et al. ................. 382/182 |
| 2014/0320933 | A1* | 10/2014 | Shiose .......................... 358/452 |
| 2014/0340714 | A1* | 11/2014 | Hiraishi ....................... 358/1.18 |
| 2015/0062666 | A1* | 3/2015 | Ohk .............................. 358/474 |

* cited by examiner

*Primary Examiner* — Helen Q Zong
(74) *Attorney, Agent, or Firm* — LeighAnn Weiland; Veronica Weinstein (57) ABSTRACT

Systems and method for improving the quality of document images are provided. One method includes identifying a plurality of image fragments within a previously received document image that includes text. The method further includes separating the plurality of image fragments into a plurality of classes. Each class includes a subset of the plurality of image fragments that are substantially similar to one another. The method further includes, for each of the plurality of classes: (1) processing a class of image fragments to generate a combined and substantially enlarged image fragment for the class; and (2) filtering the combined and substantially enlarged image fragment to generate a filtered image fragment for the class. The method further includes generating an improved document image by replacing or modifying the image fragments within the document image based on the filtered image fragments.

39 Claims, 9 Drawing Sheets

FIG. 1

FIG. 2 ot table in the spreadsheet.

Now showing

When the pivot table appears, you'll see that you can quickly and easily select a specific product from the ProductName drop-down list and view the quantity on hand and on order, along with the unit size for the product (12 bottles per case, for example). Still, why go through the trouble to view this data in Excel if you can perform a query in Access and get the same result? The primary reason is familiarity. You might be very familiar with Excel, but have no experience with Access. So, you can work in familiar surroundings without getting lost.

*FIG. 3B* ot table in the spreadsheet.

Now showing

When the pivot table appears, you'll see that you can quickly and easily select a specific product from the ProductName drop-down list and view the quantity on hand and on order, along with the unit size for the product (12 bottles per case, for example). Still, why go through the trouble to view this data in Excel if you can perform a query in Access and get the same result? The primary reason is familiarity. You might be very familiar with Excel, but have no experience with Access. So, you can work in familiar surroundings without getting lost.

*FIG. 4D* ot table in the spreadsheet.

Now showing

When the pivot table appears, you'll see that you can quickly and easily select a specific product from the ProductName drop-down list and view the quantity on hand and on order, along with the unit size for the product (12 bottles per case, for example). Still, why go through the trouble to view this data in Excel if you can perform a query in Access and get the same result? The primary reason is familiarity. You might be very familiar with Excel, but have no experience with Access. So, you can work in familiar surroundings without getting lost.

*FIG. 5A* ot table in the spreadsheet.

Now showing

When the pivot table appears, you'll see that you can quickly and easily select a specific product from the ProductName drop-down list and view the quantity on hand and on order, along with the unit size for the product (12 bottles per case, for example). Still, why go through the trouble to view this data in Excel if you can perform a query in Access and get the same result? The primary reason is familiarity. You might be very familiar with Excel, but have no experience with Access. So, you can work in familiar surroundings without getting lost.

METHOD AND APPARATUS FOR USING AN ENLARGEMENT OPERATION TO REDUCE VISUALLY DETECTED DEFECTS IN AN IMAGE

CROSS REFERENCE TO RELATED APPLICATIONS

This application is a continuation-in-part of pending U.S. patent application Ser. No. 14/314,081 filed Jun. 25, 2014. This application claims the benefit of priority under 35 U.S.C. 119 to U.S. Patent Application No. 61/882,615 filed on Sep. 25, 2013; both U.S. Patent Application No. 61/890,014 filed on Oct. 11, 2013 and U.S. Patent Application No. 61/890,023, filed on Oct. 11, 2013; and additionally to Russian Patent Application No. 2013157755, filed on Dec. 25, 2013; the entire specifications of which are incorporated herein by reference.

BACKGROUND

A text image (raster image of a text) received by scanning or photographing a document usually has a large quantity of artifacts and noise, which are visible during reading from a screen and printing with large resolution. The noise can be, for example, surface noise (separate noise pixels along character outlines). The similar distortions are intrinsic not only for images with text information, but also for images with graphical content (scheme, graphics, diagrams, and/or others synthetic images) as well.

There are a number of solutions for improving visual perception of a raster document image. For example, the text in a document can be recognized, and a font which is most close to an original can be selected. Unfortunately, it is not always possible to precisely fit the font, and the errors in recognition can lead to erroneous character replacing. Moreover, character recognition requires significant time and computing capability. For these reasons, character recognition is not a practical solution if only visual text improvement is required.

Another possible solution is a vectorization of a raster image. Vectorization is a complex and computationally expensive process. Further, vectorization does not ensure that the document saved in vector form will not have a larger size and/or will not include significant artifacts.

One more simple approach is using a method of image filtering. Existing methods usually do not yield a good enough result when they are applied to an image of a text. Various methods of local processing wherein improving images is based on neighboring pixel values cannot provide sufficient results.

Thus, there is a need for a document image enhancement method that utilizes special approaches that are not sufficiently developed in the areas of image processing methods and/or computer graphics.

SUMMARY

In general, one aspect of the subject matter described in this specification can be embodied in methods that include the actions of performing a scaling procedure on a portion of the document image resulting in an interim image portion; displaying the interim image portion; initiating a full process of improvement of the portion of the document image comprising; identifying, using a computing device comprising one or more processors, a plurality of image fragments within the portion of the document image; separating, using the computing device, the plurality of image fragments into a plurality of classes, wherein each class of the plurality of classes includes a subset of the plurality of image fragments that are substantially similar to one another; for each of the plurality of classes: combining, using the computing device, the image fragments for one or more of the classes of image fragments to generate a combined image of the class of the image fragments; substantially enlarging, using the computing device, the combined image of the class for one or more of the classes of image fragments to generate an enlarged image of the class of the image fragments; filtering, using the computing device, the enlarged image of the class to generate a filtered image of the class of the image fragments; generating, using the computing device, an improved portion of the document image by replacing the image fragments within the portion of the document image based on the filtered images of the respective classes of the image fragments. Other implementations of this aspect include corresponding systems, apparatus, and computer programs.

These and other aspects can optionally include one or more of the following features. The reducing visually detectable defects in a document image can further include the steps of initiating the full process of improvement of the document image in full; initiating the full process of improvement of a second portion of the document image, where sometimes the second portion of the full document image is adjacent to the portion of the full document image or a location of the second portion is determined based on a reading order of a user; for each of the plurality of classes, normalizing the image fragments of the class prior to the combining of the image fragments; for each of the plurality of classes, performing an inverse normalization on each image fragment in the class of image fragments prior to generating the improved portion of the document image, wherein generating the improved portion of the document image comprises replacing the image fragments within the portion of the document image with corresponding improved image fragments within the plurality of classes after the inverse normalization has been performed.

The processing of the class of image fragments to generate the enlarged image of the class can comprise averaging the image fragments of the class. The filtering of the enlarged image of the class can comprise performing at least one of a rank filtering procedure and a contour filtering procedure on the enlarged image of the class to generate the filtered image for the class. Each of the plurality of image fragments can represent one of a single character or a single character part, and separating the plurality of image fragments into a plurality of classes comprises grouping together all image fragments representing same character or same character part within a single class of the plurality of classes.

The plurality of classes can comprise a first plurality of classes, and separating the plurality of image fragments can comprise separating the plurality of image fragments into the first plurality of classes and a second plurality of classes, where each of the second plurality of classes comprises a single image fragment having no other substantially similar image fragment within the plurality of image fragments, where for each of the second plurality of classes the combining step is not performed.

These and other aspects can additionally include one or more of the following features. The reducing visually detectable defects in a document image can further include the steps of retaining data generated during one or more of the steps selected from a group including: the identifying the plurality of image fragments; the separating the plurality of image fragments into the plurality of classes; the combining the image fragments; the substantially enlarging the combined image of the class; and the filtering the enlarged image; performing a second scaling procedure on the portion of the image resulting in a second interim image portion; and initiating the full process of improvement of the portion of the document image utilizing the retained data. Also the reducing visually detectable defects in a document image can further include the steps of retaining data generated during one or more of the steps selected from a group including: the identifying the plurality of image fragments; the separating the plurality of image fragments into the plurality of classes; the combining the image fragments; the substantially enlarging the combined image of the class; the filtering the enlarged image; and the full process of improvement of the document image in full; utilizing the retained data during further steps of reducing the visually detectable defects in the document image The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

The present disclosure provides systems and methods that may be used to improve image quality with respect to visual perception. In some embodiments, a method may allow the user to process and view a scanned or photographed document image so that the text of the image is visually improved, similar to a digital text. In some embodiments, processing of a document image may be done in an automated manner, for example, when a document file is opened or zoomed in. In some embodiments, improvements may be achieved at least in part by enlarging raster images of characters and applying series of smooth and/or rank filtrations to the enlarged image portions.

In some embodiments, an exemplary system may perform enlarging and filtering for each separate character. In some embodiments, any similar character images (and/or image fragments) may be found, and then their raster image representations may be averaged. The system may subsequently enlarge and filter the averaged character images. Hereafter, a fragment should be considered a part of an image where a whole character or its part, and/or a part of a synthetic image, graph, diagram, formula, graphic image, background, etc., can be represented.

Detecting and averaging the fragments (e.g., images of similar characters) with the subsequent processing of averaged raster images may produce higher quality images than processing each fragment (e.g., character image) individually. An image including text always has a limited character set; therefore, the image typically includes repeated characters. For synthetic image portions, non-repetitive characters, and/or background image portions, self-similar image areas (fragments) can be found within the image as well.

Figure 4A:
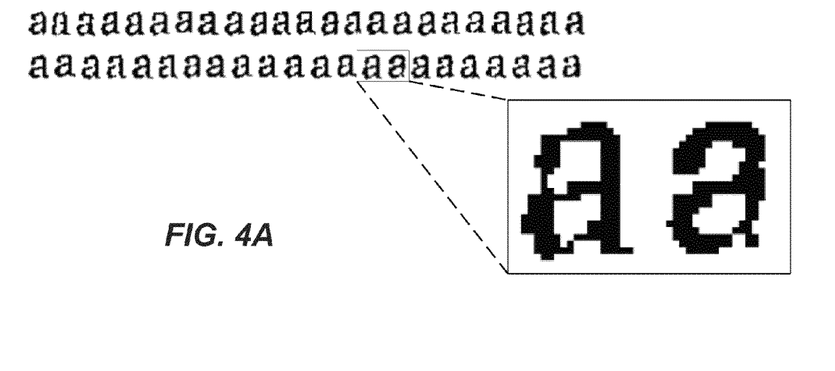
FIG. 4A is an illustration of a class of similar image fragments detected within an image according to an exemplary embodiment.

Low visual image quality can often be the result of different kinds of noise, artifacts, and/or other defects. In some embodiments, an image processing method may identify all instances of a particular image fragment type (e.g., a character or part of a character) within a received image. Often, the different instances of identical or substantially similar fragments (e.g., a particular character) can be damaged differently (e.g., defects and noise can differ, or can arise in different parts of a character), for example, as shown in FIG. 4A. In such cases, the defective characters may be restored by special calculated filtering, as described in further detail below.

Figure 1:
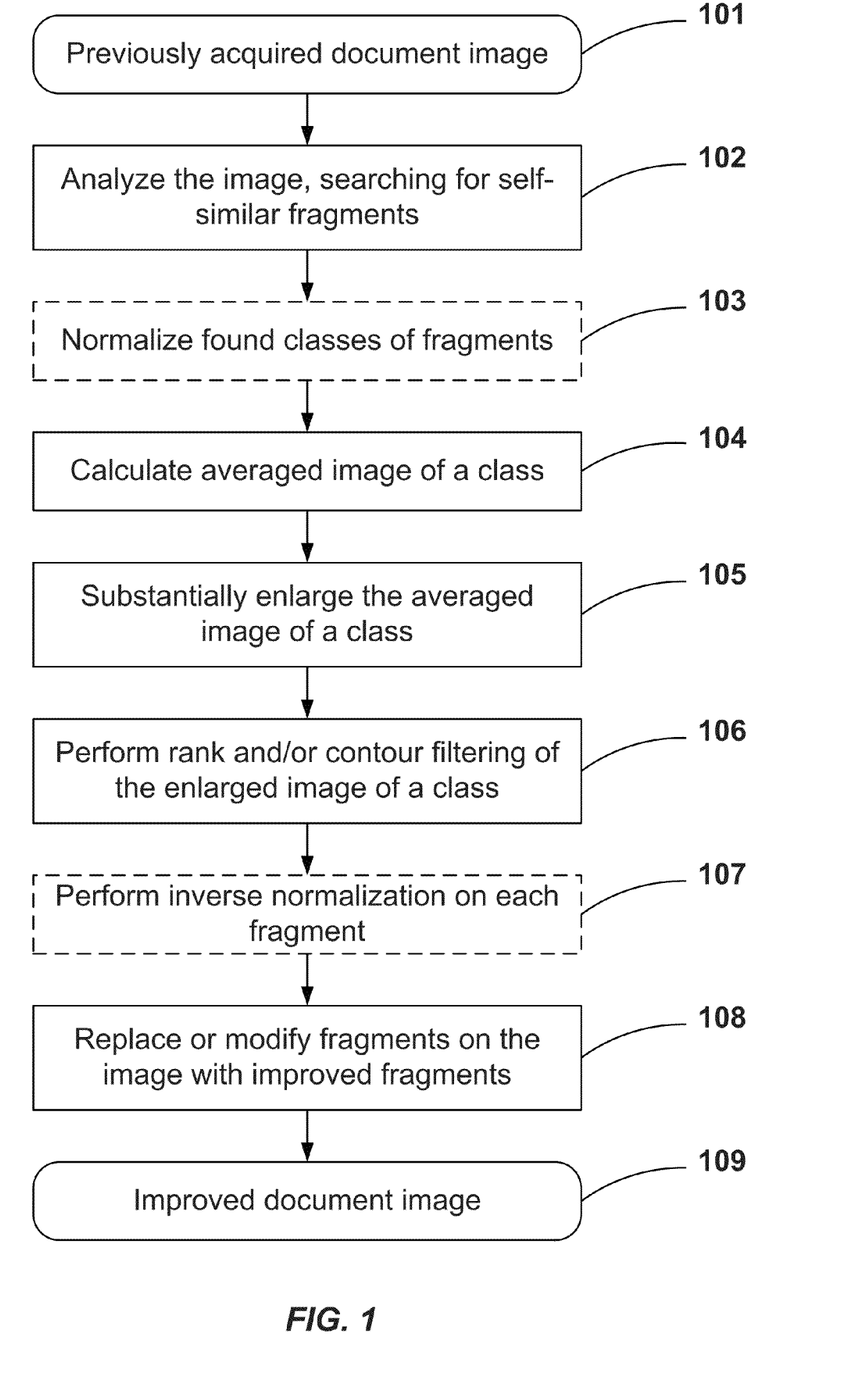
FIG. 1 is a flow diagram of a process for improving the image quality of a document image according to an exemplary embodiment.

Referring now to FIG. 1, a process for improving the quality of at least a portion of an image (e.g., an image including text) is shown according to an exemplary embodiment. An image processing system may acquire or have previously received an original document image (101). In some embodiments, the original document image may be included within a data file received by the system (e.g., a PDF, DJVU, TIFF, JPEG, RAW, GIF, BMP, PNG, word processing document, spreadsheet, presentation slide set, and/or any other type of file format capable of representing and/or including image data). In some embodiments, the original document image may be acquired from a scanning device, such as a standalone scanner, a multifunction copier/scanner device, or another device configured to scan an image from a printed substrate (e.g., paper). In some embodiments, the original document image is acquired from a camera in a mobile device, or another device configured to produce a photographed image. In various embodiments, the system may receive the original document from a user of the system or from a third party (e.g., a party different from the user). In some embodiments, the system may receive the original document after the quality of the document has been degraded from its original form (e.g., to lower a file size prior to transmission over a data network, as a result of a scanning procedure at a scanning device, etc.), and the process shown in FIG. 1 may be used to at least partially restore the quality of the document.

The system may be configured to analyze the image or a portion of the image and to segment the image or the image portion into similar image fragments (102). The system may search for self-similar areas in the image by determining a degree of similarity between different areas in the image. In some embodiments in which the image part contains text, the system may be configured to segment areas of the image in a manner such that each segment area contains a single character. In some embodiments, the combined segments may cover less than the entire original image. In some embodiments, self-similar areas may be overlapping. In some embodiments, the system may quickly search for similar fragments in an image containing text using a rough optical character recognition (OCR) technique or algorithm. The system may classify the recognized same characters as part of a single class of characters or image fragments.

To locate similar fragments in an image, a metric defining a degree of similarity of detected fragments may be selected. The system may determine fragments that are substantially similar to be part of a class of fragments, where any fragment from the class is a class member. The system may determine whether fragments below to a particular class based at least in part on whether a metric associated with the fragments does not exceed a threshold value of the selected metric. The dimension of a class is determined by a number of fragments in the class (e.g., such that a class with a dimension of one includes a single fragment, a class with a dimension of five includes five fragments, etc.). A non-repetitive fragment (i.e., not having a self-similar fragment) may form a separate class with dimension equal to one, so that an enhancement may be implemented in all image areas. Each class includes a subset of the identified fragments within the document. For example, a first class may include the subset of fragments including the character 'a', a second class may include the subset of fragments including the character 'b', and so on.

In some embodiments, a degree of similarity of detected fragments can be defined with measures such as Mean Squared Error (MSE) or Mean Absolute Error (MAE). Such measures may be simple, but may not provide as precise a measure of a degree of similarity for two images as can be obtained through subjective evaluation.

In some embodiments, a different measure of similarity may be used, e.g., correlation of two images, Hausdorff distance, or different modifications of various metrics. Metrics like Hausdorff distance are more precise in measuring similarity than MAE, but also require more resources to calculate.

In some embodiments, both measures can be used during different stages. For example, in some embodiments, the system may utilize a metric such as MAE or MSE to provide a rough estimate of similarity in a first fast stage in which classes are identified, and may use a different metric (e.g., a more precise metric, such as Hausdorff distance) for identifying members of the classes.

In some embodiments, the system may perform further processing on detected similar fragments to normalize a size, shape, and/or other characteristics of the fragments within each class (103). For example, a size and/or shape of the fragments may be normalized, such that the normalized fragments have a substantially uniform size and/or shape after processing. If the original image is color or grayscale, fragments may be normalized to a uniform degree of brightness and contrast. In some embodiments, for color fragments, tint normalization may also be performed. In some embodiments, the system may be configured to normalize fragments within a class by using normalization settings and adjusting to a uniform degree (equalization) one or multiple image parameters, such as brightness, contrast, saturation, intensity, hue, tint, gamma correction, etc. For black-and-white (binarized) images, normalization (e.g., color and/or brightness normalization) may not be needed; selecting fragments with identical or substantially similar size may be sufficient.

Normalization can be performed using a variety of different methods. In some embodiments, transformation of brightness and contrast can be computed for each image fragment based on the characteristics of its histogram with use of histogram equalization.

Figure 2:
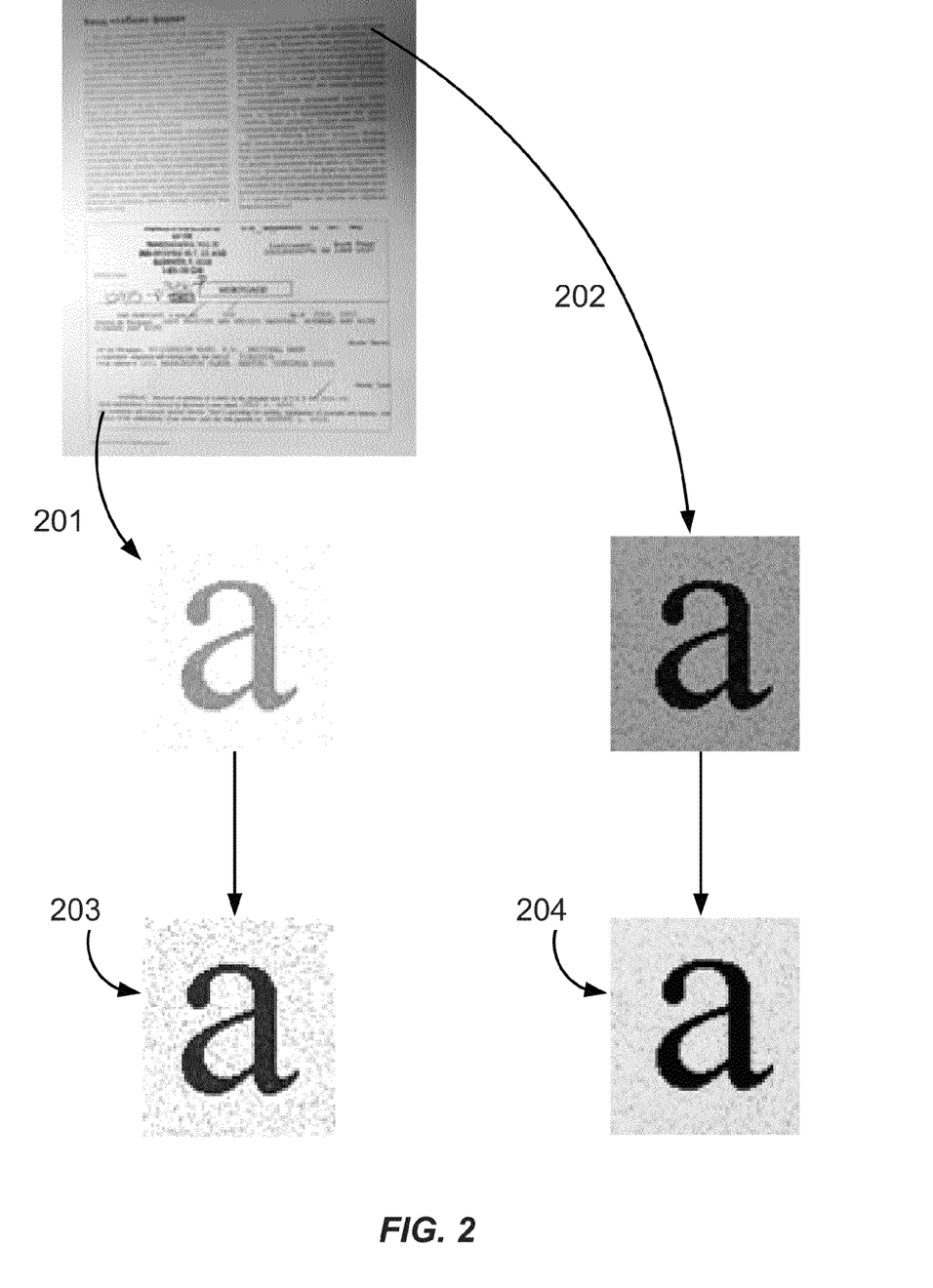
FIG. 2 is an illustration of portions of an image modified using a histogram function according to an exemplary embodiment.

In some embodiments, a histogram may be used, and may be a function that identifies, for each brightness value, a number of pixels having such brightness. Usually, this function can be represented by a graph, where the x axis is a scale of brightness values (e.g., from 0 to 255), and the y axis shows a number of pixels in an image or image fragment having this brightness value. Hence, a histogram of a dark portion of an image, such as dark image portion 202 shown in FIG. 2, will be mostly "shifted" to the left. Conversely, the histogram of a light portion of an image, such as light image portion 201 shown in FIG. 2, will be mostly shifted to the right. After bringing similar fragments to a uniform contrast range, the system may perform histogram equalization, so that a brightness distribution in a histogram of a fragment become more even (see, e.g., processed light image fragment 203 and processed dark image fragment 204 of FIG. 2). As a result of the normalization of the image fragments within a class, the histograms of all fragments within the class may be similar.

In some embodiments, normalization parameters applied to a given fragment and/or functions associated with each histogram transformation may be stored for each fragment to allow the system to later apply inverse normalization transformations (see 107).

Figure 3A:
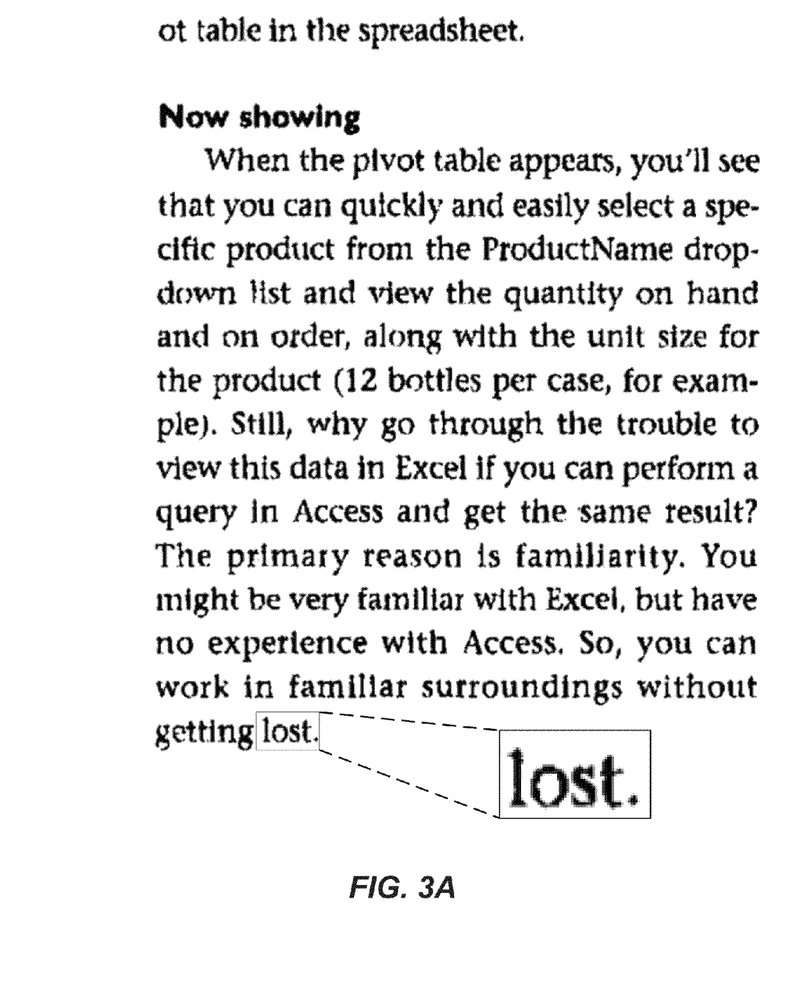
FIG. 3A is an illustration of a binarized image according to an exemplary embodiment.

FIG. 3A shows an illustration of a binarized image according to an exemplary embodiment. FIG. 4A shows an illustration of a particular class of similar fragments, corresponding to the character 'a', detected within the image shown in FIG. 3A. As can be seen in FIG. 4A, there are visible differences between the different image fragments of the class shown in FIG. 4A prior to the image processing operations 104-108 of FIG. 1 are performed.

Referring again to FIG. 1, using a class of fragments (e.g., normalized fragments from one class), the system can generate a combined image of fragments for the class (e.g., an averaged or weighted average image of the class) (104). In some embodiments, the averaged image of a class may be grayscale in the case of black-and-white or grayscale fragments (if original image was black-and-white or grayscale), and the value of every pixel may be computed as a mean value of brightness of the corresponding pixels in the fragments of the class.

A formula for computation of pixel brightness of an averaged image, according to one exemplary embodiment, is given by:

$$\tilde{F}(x, y) = \frac{1}{N} \sum_{k=1}^{N} F_k(x, y),$$

where N is the dimension of the class, and $F_k$, k=1, N are images of fragments in a class.

The averaged image of a class may be color in case of color fragments, and can be computed similarly, depending on a color model. For example, for an RGB model, a mean value of each color parameter (red, green and blue) for a pixel can be computed.

In some embodiments, more complex averaging methods may be used. For example, instead of using an averaged image, a weighted average image of a class may be calculated using certain estimates (weights) for each fragment in a class.

Figure 4B:
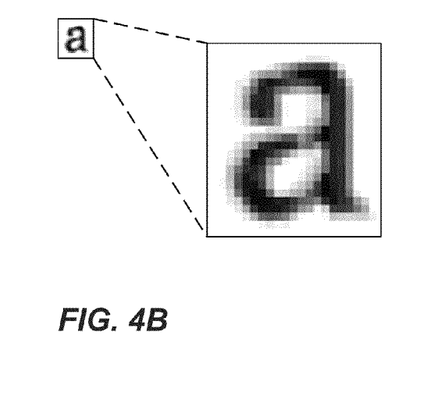
FIG. 4B is an illustration of an averaged image for the class of similar image fragments shown in FIG. 4A according to an exemplary embodiment.

FIG. 4B illustrates an averaged image for the class of character 'a' image fragments shown in FIG. 4A that may result from an averaging operation such as operation (104) according to an exemplary embodiment.

In some embodiments, combination methods other than averaging may be used.

Figure 4C:
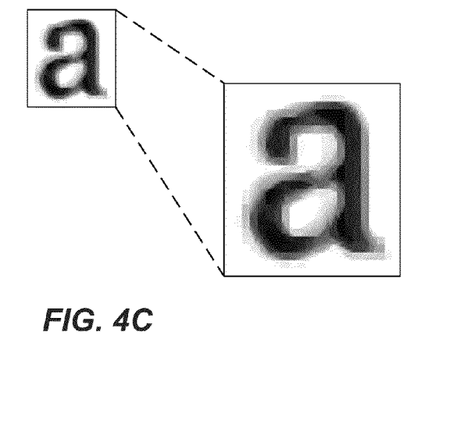
FIG. 4C is an illustration of an enlarged image of the class obtained from the averaged image for the class of FIG. 4B according to an exemplary embodiment.

Referring again to FIG. 1, various filtering methods for processing of grayscaled and/or colored images can be applied to the averaged image. In some embodiments, the system may be configured to substantially enlarge the received averaged images of classes (105) and/or perform a special filtration on the image fragments (106). In order to obtain a better visual quality, an image scaling method (e.g., bilinear interpolation, bicubic spine interpolation, pixel art scaling algorithms, etc.), which takes into consideration pixel values in the neighborhood of a pixel being expanded, may be used. FIG. 4C shows an illustration of an enlarged image of the class obtained from the averaged image of the class of FIG. 4B according to an exemplary embodiment. In some embodiments, the system may enlarge the images of classes to a multiple of the original size of the image fragment(s) (e.g., 2×, 3×, 5×, etc.). In some embodiments, the system may substantially enlarge the images of classes such that the image fragment(s) are noticeably larger when presented to the user and defects in the document are more noticeable to the viewer. In some embodiments, the system may substantially enlarge the images of classes such that, when using a mobile computing device and viewing the document image on a small display screen, the images of classes may be enlarged to a size that is readable by a user. In various embodiments, the system may improve the image in real time (interactively), when a user is viewing a document image. In such embodiments, the system may enlarge the images of classes (at stage 105) in accordance with scale factor applied by the user to the original document image.

In some embodiments, the system may be configured to enlarge the image fragments before generating the averaged image of the fragments for a class. In such embodiments, an averaged image of a class may be calculated using the enlarged fragments.

Referring again to FIG. 1, appearance of different noise and artifacts on contours (outlines) of objects or parts of objects is inevitable, even after scaling an averaged image. To reduce noises and make contours smoother, a special filter can be used (106). Such a filter may take into consideration the nature of the artifacts typical for a chosen scaling method and/or information contained in an image (text information, graphic, etc.).

In some embodiments, in the case of scaling with bilinear or bicubic interpolation, the filter is a nonlinear, two-dimensional rank operator with a (2r+1)*(2r+1) squared window. The window covers a current pixel (in the center) and considers its neighboring pixels. For each element in the window, a convolution with a preset kernel may be calculated.

The system may then sort the received values in ascending order, and an element with number ((2r+1)*(2r+1)+1)/2 in a sorted array may be a result of a rank operator. Such a filter may substantially reduce mixed uniform noise and impulse noise around contours of objects.

For instance, in some embodiments, the following parameters can be used. In case of 3 times scaling with bicubic interpolation, the smoothing may be performed by the described filter, where convolution is being run with a 3×3 kernel of the following type:

| | | |
|---|---|---|
| 1/16 | 2/16 | 1/16 |
| 2/16 | 4/16 | 2/16 |
| 1/16 | 2/16 | 1/16. |

The image smoothed by such a filter may be exposed to further processing. For example, in some embodiments, further contour filtration, such as the filtration techniques described below, may be performed.

In some embodiments, e.g. for non-text images (or image areas), collaborative filtering and/or Wiener filtering may be used. A collaborative filtering procedure may operate to find similar fragments, which may be partly overlapping, and collect them in a set one by one (like a pile), then perform a joint filtering of that set. In some embodiments, the system may utilize the Block-Matching and 3D (BM3D) filtering algorithm or a similar collaborative algorithm.

If the original image is black-and-white, then the resulting image may be black-and-white as well. In such embodiments, the previously smoothed image may be binarized, and then a coordinate filter may process the contour points. Coordinates of points can be considered as one-dimensional signals $x_i$ and $y_i$. A one-dimensional signal may be processed by the filter by averaging, Gaussian smoothing, Butterworth filtering, or other types of filter processing methods. In some embodiments, recursive filtering processes may be used. Then, the received coordinates of contour points may be redrawn in a final image.

In some embodiments, if the original image is grayscale or color, then raster contour filtration may be performed. First, the contour areas where a space smoothing procedure along the length of a contour line should be made are found. For this purpose, a gradient in every point of an image may be computed. A gradient module and its direction can indicate the necessary smoothing required. Smoothing in areas of sharp step changes of gradient direction may be avoided. Higher results may be achieved if smoothing is performed iteratively until the desired degree of smoothness has been reached.

Figure 4D:
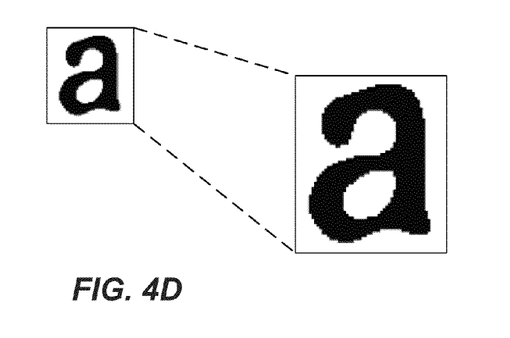
FIG. 4D is an illustration of an improved image of the class after further processing is performed on the enlarged image of FIG. 4C according to an exemplary embodiment.

After applying all desired improving filters to the enlarged averaged image of a class, the improved large image of the class will have higher visual quality. For example, FIG. 4D shows an illustration of an improved image of the class after filter processing is performed on the image of FIG. 4C according to an exemplary embodiment.

A simplified procedure of visual enhancement may be performed for classes with dimension equal to one (if only one fragment created the class). For example, in some such embodiments, only the contour filter may be applied, or the contour filter may be applied in combination with only a set of additional simplified filters. In some embodiments, all non-repetitive fragments are processed together within the framework of the original image.

In some embodiments, the improved averaged image of a class may be utilized as a replacement for each class member within the larger image. In some embodiments, from the improved averaged image of a class, an improved fragment for each class member can be obtained by means of inverse normalization transformation (107). Parameters of inverse normalization can be obtained for each fragment on the basis of parameters which were used to normalize the fragment.

Figure 3B:
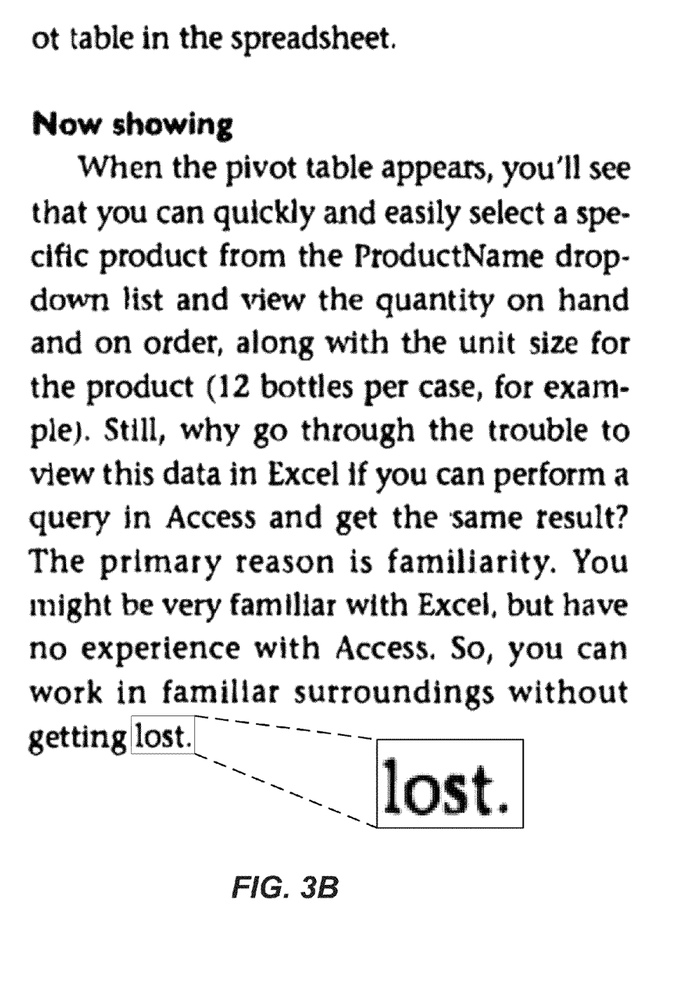
FIG. 3B is an illustration of the binarized image of FIG. 3A with improved quality using the process shown in FIG. 1 according to an exemplary embodiment.
Figure 5A:
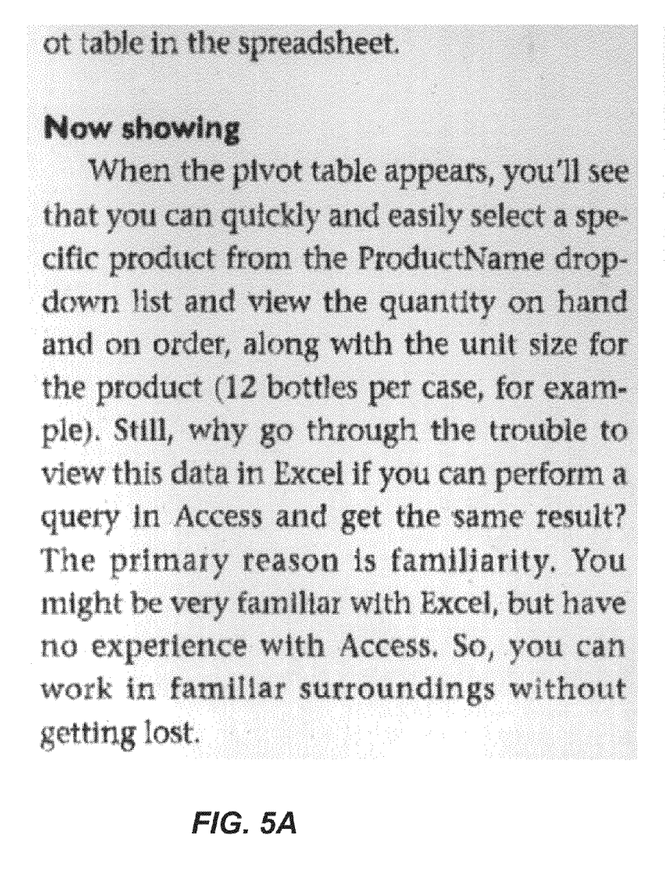
FIG. 5A is an illustration of a grayscale image according to an exemplary embodiment.
Figure 5B:
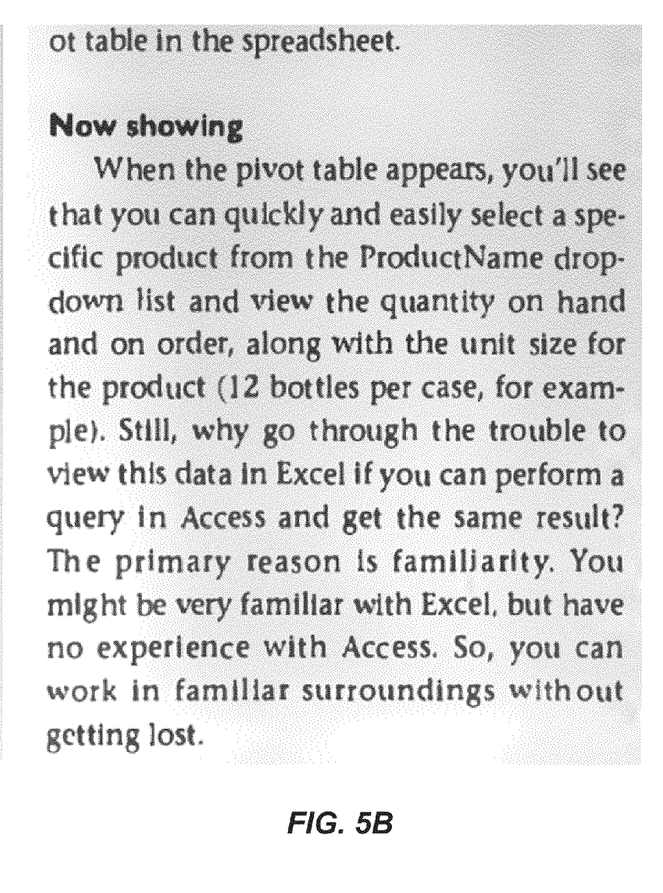
FIG. 5B is an illustration of the grayscale image of FIG. 5A with improved quality using the process shown in FIG. 1 according to an exemplary embodiment.

The original image or the image portion may be improved by modifying the image fragments associated with each class based on the processed representative (e.g., averaged) image for the class and/or the inverse-normalized class members (108). In some embodiments, the fragments in the original image may be replaced with the improved image fragments or with the improved image of corresponding class. In some embodiments, the fragments in the original image may be modified based on the improved image fragments to improve the quality of the original fragments. The resultant document image may be an improved document image having a higher quality than the original document image (109). For example, FIG. 3B shows an improved version of the binarized image shown in FIG. 3A after a process such as the process shown in FIG. 1 has been applied according to an exemplary embodiment. In the grayscale context, FIG. 5B shows an improved version of a grayscale image shown in FIG. 5A after a process such as the process shown in FIG. 1 has been applied according to an exemplary embodiment.

In some embodiments, a process such as the process shown in FIG. 1 may be applied in such technologies as MRC (Mixed Raster Content) compression to obtain a better quality of a monochrome mask. Using such an improved mask may result in better visual quality of text in compressed files.

In some embodiments, a process such as the process shown in FIG. 1 may be applied to a broad variety of types of images. If the characteristics of processed images are initially known, then more specific parameters and filters can be used. Moreover, preliminary profiles with adjusted parameters can be created for different image types, allowing a user to choose a profile in correspondence with the image to be processed. In some embodiments, profiles may be automatically chosen by the system using image processing and/or recognition methods.

In some embodiments, a process such as the process shown in FIG. 1 may be used to improve the quality of a portion of an image, rather than the entire image. In such embodiments, the disclosed method may be applied for improving a portion of an image viewed on a screen at the moment, for example, when various mobile devices with small screen are used for displaying images. A portion of an image may be improved in real time once the user performs an action to zoom in the image or to move the image portion. For example, a selection of an image portion may be received from a user input device of a user device. In some embodiments, the selection may be made via a touch-screen display device of a mobile computing device, such as a smartphone, tablet, laptop, cameras, etc. For example, a user may pinch, double-tap, or otherwise provide input indicating a desire to zoom in on a portion of a displayed document image. In response, the user device may display an enlarged and improved representation of the selected portion of the document image. The user device and/or a server device serving the document image may be configured to perform processing to provide a greater level of detail for the displayed enlarged portion than is shown in the normal, full document image view.

In some embodiments, the system (e.g., the user device and/or a server device providing the document image to the user device) may be configured to perform processing similar to the operations shown in FIG. 1 to generate an enlarged image portion having a higher image quality. The system may analyze the selected image portion and separate the image portion into image fragments. In some embodiments, the system may process the entire document image to identify similar image fragments for inclusion within the classes of image fragments. Including the entire document in the image fragment classification may improve the quality of the final enlarged image portion, because the averaging and/or filtering steps may be based on a larger number of image fragment samples from the document image. In some embodiments, the image fragment classification may be performed based only on the fragments (e.g., characters) included within the selected image portion. Using only the selected image portion may decrease the computational resources required to perform the image processing operations.

Once the image fragments have been separated into classes, the fragments can be averaged, enlarged, and/or filtered according to the operations shown in FIG. 1 and described in detail above. In some embodiments, the system may substantially enlarge the images of classes such that, when viewing the document image on a small display screen of a mobile computing device such as a smartphone, the image fragment(s) may be enlarged to a size customarily readable by a user. The resultant processed image fragments may be used to replace or otherwise modify the image fragments included within the selected area to generate an enlarged area having an improved image quality. The improved enlarged area may then be displayed on the user device. In some embodiments, this process may be performed as a background process (e.g., when the process is hidden from a user). In some embodiments, parameters, results, and/or other data associated with the performed processing may be stored in memory to allow for faster processing of other areas within the document image. In some embodiments, the entire document image may be improved at the time the selected portion is improved, but only the selected portion may be displayed to the user until the user zooms out of the selected area.

Figure 6:
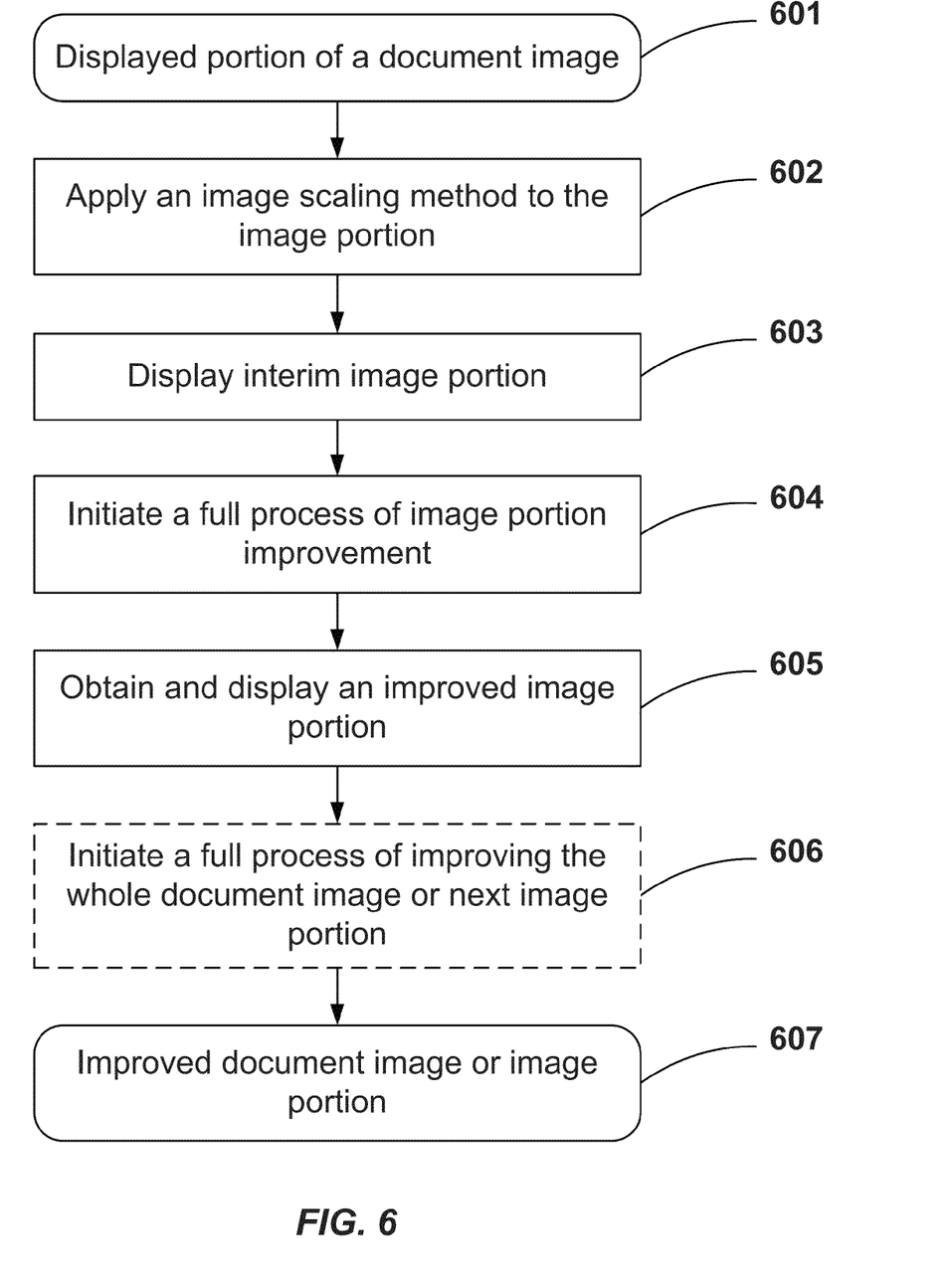
FIG. 6 is a flow diagram of a process for improving the image quality of an image portion according to an exemplary embodiment.

An exemplary implementation of principles disclosed above for mobile devices is shown in a flow diagram of FIG. 6. FIG. 6 shows an adapted process for improving quality of at least a portion of an image (e.g., an image including some text), which is based on operations shown in FIG. 1 and can be used in devices to improve images in real time during viewing of the images. A limited capacity is typical of most mobile devices, so when improving representation of enlarged (zoomed) image portions on such devices, the process may be optimized by using interim stages. An interim image portion can be obtained by performing simplified image quality improvement procedures. It may be used as a preview version of the image portion for a user to avoid delayed system responses and to display the image portion with better visual quality to a user in short time. Then a more complex procedure, like process shown in FIG. 1, may be started as a background process to obtain a final version of the image portion. In one embodiment, such background process may be launched as a process with lower priority, or it may be launched on a separate processor.

The operations shown in FIG. 6 may be initiated in response to any user's action predefined in the system, e.g. pinching, stretching, double-tap, or other input, indicating a desire to zoom in on a displayed image to enlarge a new displayed portion of the document image 601. The document image may be included within any data file received by the system (e.g., a PDF, DJVU, TIFF, JPEG, RAW, GIF, BMP, PNG, presentation slide set, and/or any other type of file format capable of representing and/or including image data).

To reduce defects on a zoomed image portion and to promptly show the user the image portion of better quality (immediately after the zooming gesture is performed), first, an image scaling method may be applied (602) to the image portion 601. This is an interim stage of the process. An image scaling method may be any known method, which provides enlarging of the images with good visual properties (e.g., bilinear interpolation, bicubic spine interpolation, pixel art scaling algorithms, etc.). Any specially adjusted or specially developed image scaling methods may be used as well. In some embodiments, the system may be additionally configured to perform a special filtration on the image portion. As a result an interim improved image portion (603) may be displayed to a user as a preview version. Such interim image portion has better image quality than the original zoomed-in image portion, and the calculation of the interim image portion can be performed quickly, because it does not require high computational power.

While a user looks at interim image portion, a full process of image portion improvement (e.g. the process shown in FIG. 1, or an adjusted version of the process, revised to be used on a mobile device) may be initiated (604) to obtain a final improved image portion (605). In some embodiments, enlargement operations during full process (at stage 604) may be performed in accordance with a scale factor applied by a user to the original document image. In one embodiment, the full process may be initiated (604) when the scale of enlargement applied by the user is significant (e.g. more than twice of the original size). The full process may be hidden from a user. In some embodiments, the interim image portion can be replaced with the improved one as soon as it is obtained. In the case where the user shifts the image portion or changes a scaling factor, the process shown in FIG. 6 may be initiated for a new image portion from the beginning or at least a portion of results of already performed operations may be used for improving the quality of the new portion of the image.

Figure 7A:
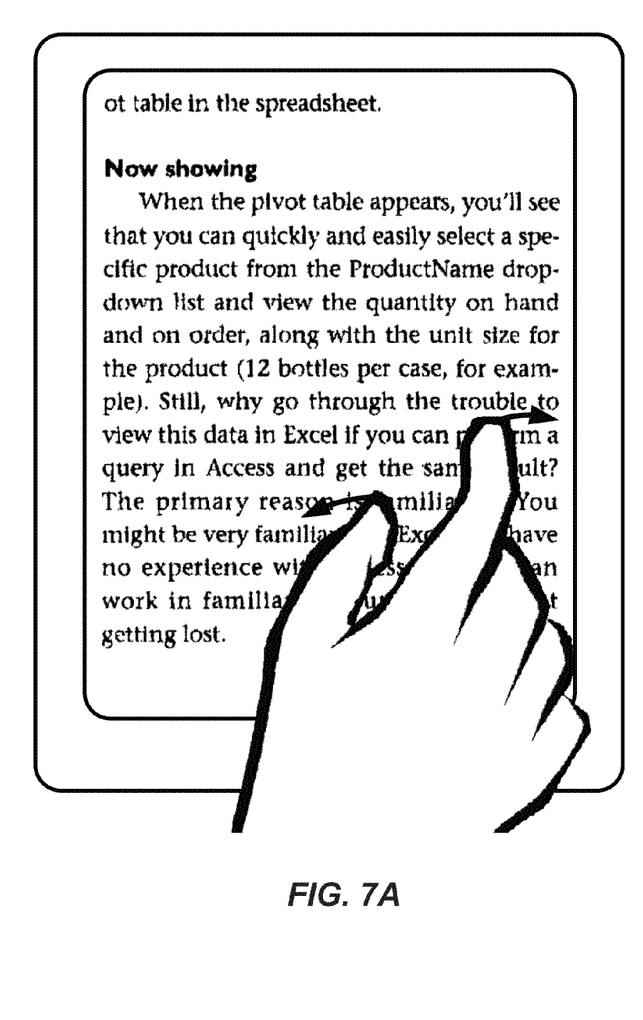
FIG. 7A is an illustration of an image displayed on a mobile device according to an exemplary embodiment.
Figure 7B:
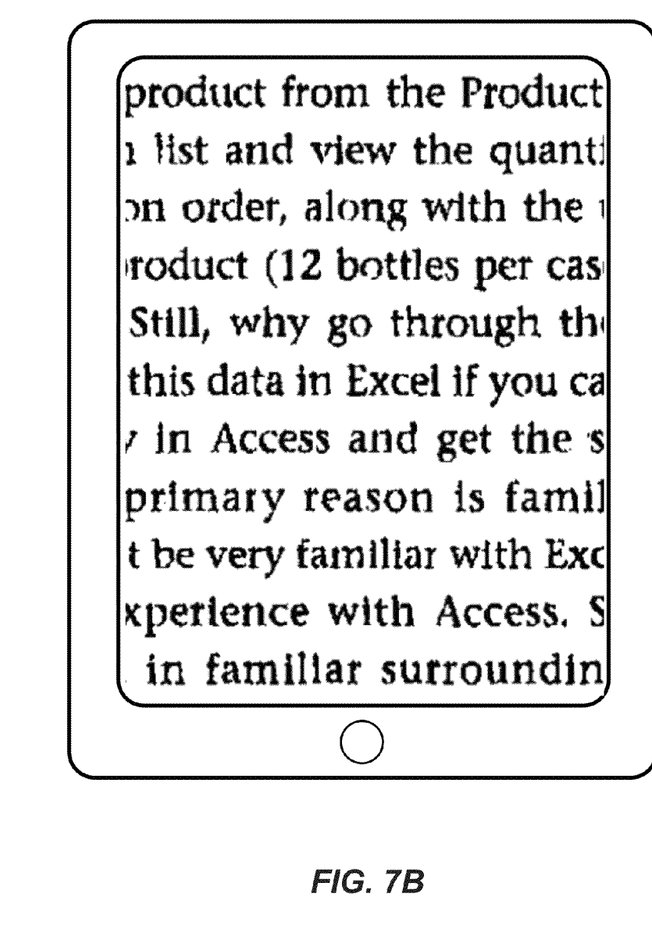
FIG. 7B is an illustration of a displayed portion of the enlarged image shown in FIG. 7A according to an exemplary embodiment.
Figure 7C:
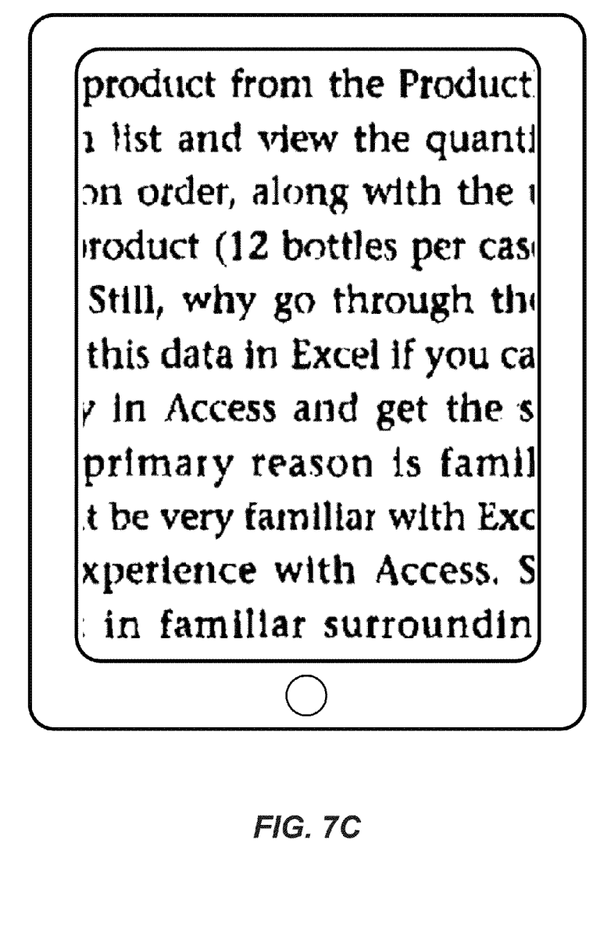
FIG. 7C is an illustration of a displayed interim image portion of FIG. 7B according to an exemplary embodiment.
Figure 7D:
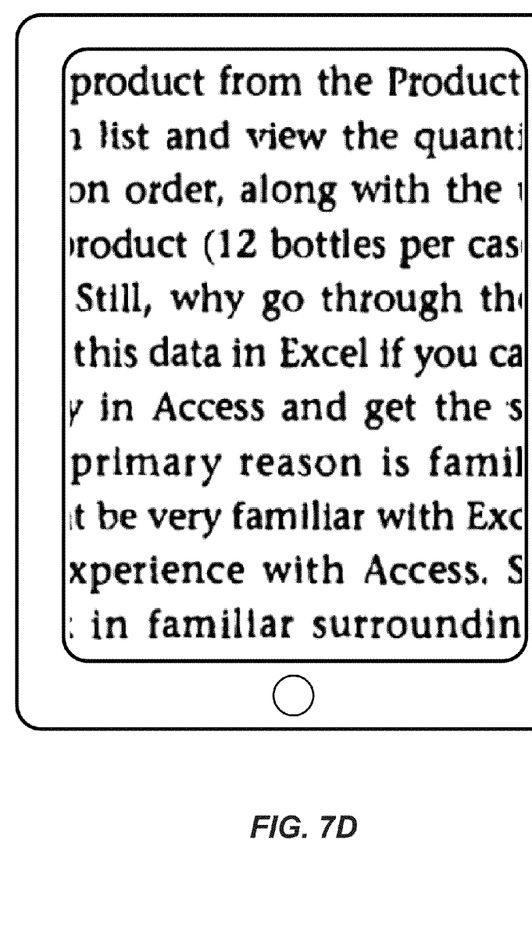
FIG. 7D is an illustration of a displayed image portion of FIG. 7B with improved quality according to an exemplary embodiment.

For example, FIG. 7A shows a document image displayed on a mobile device and a user action leading to zooming in of the document image. FIG. 7B shows a displayed portion of the document image shown in FIG. 7A and obtained by enlarging user action. FIG. 7C illustrates a displayed interim image portion obtained at stage 603 from image portion of FIG. 7B. FIG. 7D illustrates a displayed improved image portion obtained at stage 605 from image portion of FIG. 7B.

In some embodiments, information about segmented fragments, found classes and class members, calculated normalization parameters and averaged images of classes and/or other data associated with the performed processing, which were obtained at stage 604, may be stored in intermediate memory (e.g. random-access memory, running memory, internal memory, cache, etc.) to allow for faster processing of the image portion, in case the user zooms in the image portion with a larger scale factor. In such embodiments, (e.g. if full process is performed in accordance with the process shown in FIG. 1) it is enough to enlarge the averaged images of classes with new scale factor (at stage 105) and perform stages 106-108, skipping stages 102-104.

Referring to FIG. 6, further the full process for improving the whole original image may be initiated as a background process (606), if the user still viewing the improved portion obtained at stage 605, or a next viewed image portion may be improved instead of the whole document image. In one embodiment, a next viewed image portion (i.e. which expected to be next viewed by the user) can be assumed based on reading order/direction or analyzing user's browsing through the image. In one embodiment, when all parts of a document image are improved, the improved image portions can be joined in whole improved document image 607. In some embodiments, if the current document image (or page) is improved and the user is still viewing this image, the next document image, the next page or pages may be analyzed and a part of improvement process (like a process shown in FIG. 1) may be performed (e.g. segmenting into fragments, searching for self-similar fragments, normalizing of classes and calculating average images of classes) to prepare required data for accelerated visual quality improvement on image portions of the next images or pages.

In some embodiments more interim images of the potion may be obtained and displayed. For example, after image scaling of the image portion (602) a simplified image improving procedure without segmenting into fragments and forming classes of fragments may be performed. Such simplified image improving procedure may be the same as the improving procedure that was described above for classes with dimension equal to one. Then the full process of image portion improvement may be performed (604).

Such processing, similar to the operations shown in FIG. 6, allows to adapt the disclosed method for implementing on different devices with limited capability and small computational resources and, in the same time, to perform a real-time processing of an image.

Figure 8:
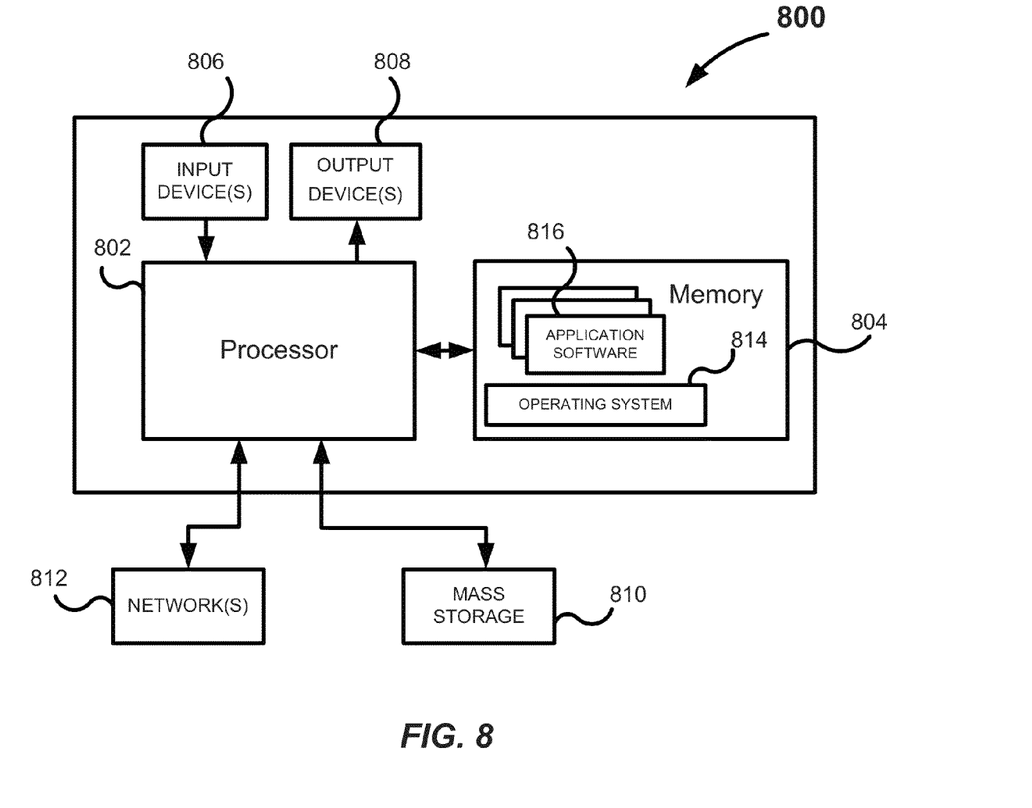
FIG. 8 is a block diagram of a system for improving the image quality of an image according to an exemplary embodiment.

FIG. 8 shows a system 800 that may enhance a text image using the techniques described above, in accordance with some embodiments of the disclosure. The system 800 typically includes at least one processor 802 coupled to a memory 804. The processor 802 may represent one or more processors (e.g., microprocessors), and the memory 804 may represent random access memory (RAM) devices comprising a main storage of the system 800 and/or any supplemental levels of memory e.g., cache memories, non-volatile or back-up memories (e.g. programmable or flash memories), read-only memories, etc. In addition, the memory 804 may include memory storage physically located elsewhere in the system 800 (e.g. any cache memory in the processor 802) as well as any storage capacity used as a virtual memory (e.g., as stored on a mass storage device 810).

Typically, the system 800 also receives a number of inputs and outputs for communicating information externally. The system 800 may include one or more user input devices 806 (e.g., a keyboard, a mouse, a scanner etc.) and a display 808 (e.g., a Liquid Crystal Display (LCD) panel) for interfacing with a user/operator. For additional storage, the system 800 may also include one or more mass storage devices 810, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 800 may include an interface with one or more networks 812 (e.g., a local area network (LAN), a wide area network (WAN), a wireless network, and/or the Internet among others) to permit the communication of information with other computers coupled to the networks. It should be appreciated that the system 800 typically includes suitable analog and/or digital interfaces between the processor 802 and each of the components 804, 806, 808 and 812 as is well known in the art.

The system 800 operates under the control of an operating system 814, and executes various computer software applications, components, programs, objects, modules, etc. indicated collectively by reference number 816 to perform the correction techniques described above.

In general, the routines executed to implement the embodiments of the disclosure may be used as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the disclosure. Moreover, while the invention has been described in the context of fully functioning computers and computer systems, those skilled in the art will appreciate that the various embodiments of the disclosure are capable of being distributed as a program product in a variety of forms, and that the disclosure applies equally regardless of the particular type of machine or computer-readable media used to actually affect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links. Computer-readable media, as included within the present disclosure, include only non-transitory media (i.e., do not include transitory signals-in-space).

Although the present disclosure has been provided with reference to specific exemplary embodiments, it is evident that the various modifications can be made to these embodiments without changing the initial spirit of the invention. Accordingly, the specifications and drawings are to be regarded in an illustrative sense rather than in a restrictive sense.

What is claimed is:

1. A method for reducing visually detectable defects in a document image, the method comprising:
performing a scaling procedure on a portion of the document image resulting in an interim image portion;
   displaying the interim image portion;
   initiating a full process of improvement of the portion of the document image comprising
      identifying, using a computing device comprising one or more processors, a plurality of image fragments within the portion of the document image, wherein each of the plurality of image fragments represents one of a single character or a single character part;
      separating, using the computing device, the plurality of image fragments into a plurality of classes,
         wherein each class of the plurality of classes includes a subset of the plurality of image fragments that are substantially similar to one another;
      for each of the plurality of classes:
         combining, using the computing device, the image fragments for one or more of the classes of image fragments to generate a combined image of the class of the image fragments;
         substantially enlarging, using the computing device, the combined image of the class for one or more of the classes of image fragments to generate an enlarged image of the class of the image fragments;
         filtering, using the computing device, the enlarged image of the class to generate a filtered image of the class of the image fragments;
         generating, using the computing device, an improved portion of the document image by replacing the image fragments within the portion of the document image based on the filtered images of the respective classes of the image fragments.

2. The method of claim 1, further comprising initiating the full process of improvement of the document image in full.

3. The method of claim 1, further comprising initiating the full process of improvement of a second portion of the document image.

4. The method of claim 3 wherein the second portion of the full document image is adjacent to the portion of the full document image.

5. The method of claim 3 wherein a location of the second portion is determined based on a reading order of a user.

6. The method of claim 1, further comprising, for each of the plurality of classes, normalizing the image fragments of the class prior to the combining of the image fragments.

7. The method of claim 1, further comprising, for each of the plurality of classes, performing an inverse normalization on each image fragment in the class of image fragments prior to generating the improved portion of the document image, wherein generating the improved portion of the document image comprises replacing the image fragments within the portion of the document image with corresponding improved image fragments within the plurality of classes after the inverse normalization has been performed.

8. The method of claim 1, wherein the processing the class of image fragments to generate the enlarged image of the class comprises averaging the image fragments of the class.

9. The method of claim 1, wherein the filtering the enlarged image of the class comprises performing at least one of a rank filtering procedure and a contour filtering procedure on the enlarged image of the class to generate the filtered image for the class.

10. The method of claim 1, wherein separating the plurality of image fragments into the plurality of classes comprises grouping together image fragments representing same character or same character part within same class of the plurality of classes.

11. The method of claim 1, wherein the plurality of classes comprises a first plurality of classes, and wherein separating the plurality of image fragments comprises separating the plurality of image fragments into the first plurality of classes and a second plurality of classes, wherein each of the second plurality of classes comprises a single image fragment having no other substantially similar image fragment within the plurality of image fragments, wherein for each of the second plurality of classes the combining step is not performed.

12. The method of claim 1 further comprising
   retaining data generated during one or more of the steps selected from a group including:
      the identifying the plurality of image fragments;
      the separating the plurality of image fragments into the plurality of classes;
      the combining the image fragments;
      the substantially enlarging the combined image of the class; and
      the filtering the enlarged image;
   performing a second scaling procedure on the portion of the image resulting in a second interim image portion; and
   initiating the full process of improvement of the portion of the document image utilizing the retained data.

13. The method of claim 2, further comprising
   retaining data generated during one or more of the steps selected from a group including:
      the identifying the plurality of image fragments;
      the separating the plurality of image fragments into the plurality of classes;

the combining the image fragments;
the substantially enlarging the combined image of the class;
the filtering the enlarged image; and
the full process of improvement of the document image in full;
utilizing the retained data during further steps of reducing the visually detectable defects in the document image.

14. A system comprising:
a machine-readable storage device having instructions stored thereon; and
a data processing apparatus in communication with the machine-readable storage device and operable to execute the instructions to perform operations comprising:
performing a scaling procedure on a portion of the document image resulting in an interim image portion;
displaying the interim image portion;
initiating a full process of improvement of the portion of the document image comprising
identifying, using a computing device comprising one or more processors, a plurality of image fragments within the portion of the document image, wherein each of the plurality of image fragments represents one of a single character or a single character part;
separating, using the computing device, the plurality of image fragments into a plurality of classes, wherein each class of the plurality of classes includes a subset of the plurality of image fragments that are substantially similar to one another;
for each of the plurality of classes:
combining, using the computing device, the image fragments for one or more of the classes of image fragments to generate a combined image of the class of the image fragments;
substantially enlarging, using the computing device, the combined image of the class for one or more of the classes of image fragments to generate an enlarged image of the class of the image fragments;
filtering, using the computing device, the enlarged image of the class to generate a filtered image of the class of the image fragments;
generating, using the computing device, an improved portion of the document image by replacing the image fragments within the portion of the document image based on the filtered images of the respective classes of the image fragments.

15. The system of claim 14, further comprising initiating the full process of improvement of the document image in full.

16. The system of claim 14, further comprising initiating the full process of improvement of a second portion of the document image.

17. The system of claim 16 wherein the second portion of the full document image is adjacent to the portion of the full document image.

18. The system of claim 16 wherein a location of the second portion is determined based on a reading order of a user.

19. The system of claim 14, further comprising, for each of the plurality of classes, normalizing the image fragments of the class prior to the combining of the image fragments.

20. The system of claim 14, further comprising, for each of the plurality of classes, performing an inverse normalization on each image fragment in the class of image fragments prior to generating the improved portion of the document image, wherein generating the improved portion of the document image comprises replacing the image fragments within the portion of the document image with corresponding improved image fragments within the plurality of classes after the inverse normalization has been performed.

21. The system of claim 14, wherein the processing the class of image fragments to generate the enlarged image of the class comprises averaging the image fragments of the class.

22. The system of claim 14, wherein the filtering the enlarged image of the class comprises performing at least one of a rank filtering procedure and a contour filtering procedure on the enlarged image of the class to generate the filtered image for the class.

23. The system of claim 14, wherein separating the plurality of image fragments into the plurality of classes comprises grouping together image fragments representing same character or same character part within same class of the plurality of classes.

24. The system of claim 14, wherein the plurality of classes comprises a first plurality of classes, and wherein separating the plurality of image fragments comprises separating the plurality of image fragments into the first plurality of classes and a second plurality of classes, wherein each of the second plurality of classes comprises a single image fragment having no other substantially similar image fragment within the plurality of image fragments, wherein for each of the second plurality of classes the combining step is not performed.

25. The system of claim 14 further comprising
retaining data generated during one or more of the steps selected from a group including:
the identifying the plurality of image fragments;
the separating the plurality of image fragments into the plurality of classes;
the combining the image fragments;
the substantially enlarging the combined image of the class; and
the filtering the enlarged image;
performing a second scaling procedure on the portion of the image resulting in a second interim image portion; and
initiating the full process of improvement of the portion of the document image utilizing the retained data.

26. The system of claim 15, further comprising
retaining data generated during one or more of the steps selected from a group including:
the identifying the plurality of image fragments;
the separating the plurality of image fragments into the plurality of classes;
the combining the image fragments;
the substantially enlarging the combined image of the class;
the filtering the enlarged image; and
the full process of improvement of the document image in full;
utilizing the retained data during further steps of reducing the visually detectable defects in the document image.

27. A storage device having instructions stored thereon that, when executed by a data processing apparatus, cause the data processing apparatus to perform operations comprising:
performing a scaling procedure on a portion of the document image resulting in an interim image portion;
displaying the interim image portion;
initiating a full process of improvement of the portion of the document image comprising
identifying, using a computing device comprising one or more processors, a plurality of image fragments within the portion of the document image, wherein each of the plurality of image fragments represents one of a single character or a single character part;

separating, using the computing device, the plurality of image fragments into a plurality of classes, wherein each class of the plurality of classes includes a subset of the plurality of image fragments that are substantially similar to one another;

for each of the plurality of classes:

combining, using the computing device, the image fragments for one or more of the classes of image fragments to generate a combined image of the class of the image fragments;

substantially enlarging, using the computing device, the combined image of the class for one or more of the classes of image fragments to generate an enlarged image of the class of the image fragments;

filtering, using the computing device, the enlarged image of the class to generate a filtered image of the class of the image fragments;

generating, using the computing device, an improved portion of the document image by replacing the image fragments within the portion of the document image based on the filtered images of the respective classes of the image fragments.

28. The storage device of claim 27, further comprising initiating the full process of improvement of the document image in full.

29. The storage device of claim 27, further comprising initiating the full process of improvement of a second portion of the document image.

30. The storage device of claim 29 wherein the second portion of the full document image is adjacent to the portion of the full document image.

31. The storage device of claim 29 wherein a location of the second portion is determined based on a reading order of a user.

32. The storage device of claim 27, further comprising, for each of the plurality of classes, normalizing the image fragments of the class prior to the combining of the image fragments.

33. The storage device of claim 27, further comprising, for each of the plurality of classes, performing an inverse normalization on each image fragment in the class of image fragments prior to generating the improved portion of the document image, wherein generating the improved portion of the document image comprises replacing the image fragments within the portion of the document image with corresponding improved image fragments within the plurality of classes after the inverse normalization has been performed.

34. The storage device of claim 27, wherein the processing the class of image fragments to generate the enlarged image of the class comprises averaging the image fragments of the class.

35. The storage device of claim 27, wherein the filtering the enlarged image of the class comprises performing at least one of a rank filtering procedure and a contour filtering procedure on the enlarged image of the class to generate the filtered image for the class.

36. The storage device of claim 27, wherein separating the plurality of image fragments into the plurality of classes comprises grouping together image fragments representing same character or same character part within same class of the plurality of classes.

37. The storage device of claim 27, wherein the plurality of classes comprises a first plurality of classes, and wherein separating the plurality of image fragments comprises separating the plurality of image fragments into the first plurality of classes and a second plurality of classes, wherein each of the second plurality of classes comprises a single image fragment having no other substantially similar image fragment within the plurality of image fragments, wherein for each of the second plurality of classes the combining step is not performed.

38. The storage device of claim 27 further comprising retaining data generated during one or more of the steps selected from a group including:

the identifying the plurality of image fragments;

the separating the plurality of image fragments into the plurality of classes;

the combining the image fragments;

the substantially enlarging the combined image of the class; and the filtering the enlarged image;

performing a second scaling procedure on the portion of the image resulting in a second interim image portion; and initiating the full process of improvement of the portion of the document image utilizing the retained data.

39. The storage device of claim 28, further comprising retaining data generated during one or more of the steps selected from a group including:

the identifying the plurality of image fragments;

the separating the plurality of image fragments into the plurality of classes;

the combining the image fragments;

the substantially enlarging the combined image of the class;

the filtering the enlarged image; and the full process of improvement of the document image in full;

utilizing the retained data during further steps of reducing the visually detectable defects in the document image.

* * * * *